United States Patent
Kusano

(10) Patent No.: US 6,908,160 B2
(45) Date of Patent: Jun. 21, 2005

(54) HYDRAULIC BRAKE APPARATUS FOR A VEHICLE

(75) Inventor: Akihito Kusano, Toyota (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/801,587

(22) Filed: Mar. 17, 2004

(65) Prior Publication Data

US 2004/0183370 A1 Sep. 23, 2004

(30) Foreign Application Priority Data

Mar. 18, 2003 (JP) ........................................ 2003-074186

(51) Int. Cl.[7] .............................................. B60T 8/44
(52) U.S. Cl. .................................. 303/114.1; 188/358
(58) Field of Search .............................. 188/347, 348, 188/349, 353, 358; 303/113.1, 113.2, 113.4, 114.1; 60/548, 552, 560, 591

(56) References Cited

U.S. PATENT DOCUMENTS

| | | | | | |
|---|---|---|---|---|---|
| 5,515,678 | A | * | 5/1996 | Kurokawa et al. | ............. 60/591 |
| 6,095,622 | A | * | 8/2000 | Oishi et al. | ............. 303/113.5 |
| 6,352,316 | B1 | * | 3/2002 | Oka et al. | ................. 303/114.3 |
| 6,705,682 | B2 | * | 3/2004 | Kusano et al. | ........... 303/114.1 |
| 6,709,072 | B2 | * | 3/2004 | Kusano et al. | ........... 303/113.4 |
| 6,729,698 | B2 | * | 5/2004 | Kusano et al. | .............. 303/191 |
| 2002/0140283 | A1 | * | 10/2002 | Kusano et al. | ........... 303/114.1 |
| 2002/0153215 | A1 | * | 10/2002 | Kusano et al. | .............. 188/355 |
| 2003/0020328 | A1 | * | 1/2003 | Kusano et al. | ........... 303/114.1 |
| 2003/0085613 | A1 | * | 5/2003 | Nakano | .................... 303/114.1 |
| 2003/0178272 | A1 | * | 9/2003 | Kusano | ....................... 188/358 |

FOREIGN PATENT DOCUMENTS

JP 7-172291 7/1995

* cited by examiner

Primary Examiner—Christopher P. Schwartz
(74) Attorney, Agent, or Firm—Burns, Doane, Swecker & Mathis, L.L.P.

(57) ABSTRACT

The present invention is directed to a hydraulic brake apparatus provided with a pressure source for generating hydraulic pressure, a hydraulic pressure boosting device having a pressure regulating valve for regulating the hydraulic pressure generated by the pressure source in response to braking operation by a vehicle driver, a master cylinder for advancing a master piston by the hydraulic pressure discharged from the hydraulic pressure boosting device, and a wheel brake cylinder operatively mounted on each wheel of the vehicle. A pressure supply device is provided for supplying the hydraulic pressure from the pressure regulating valve into a hydraulic pressure circuit including the master cylinder and the wheel brake cylinder, when the hydraulic braking pressure discharged from the master cylinder is equal to or greater than a predetermined starting reference pressure, which is set to be equal to or greater than a hydraulic pressure corresponding to a predetermined vehicle deceleration, and/or when the hydraulic pressure discharged from the pressure regulating valve is approximately equal to or greater than the starting reference pressure.

7 Claims, 2 Drawing Sheets

HYDRAULIC BRAKE APPARATUS FOR A VEHICLE

This application claims priority under 35 U.S.C. Sec.119 to No.2003-074186 filed in Japan on Mar. 18, 2003, the entire content of which is herein incorporated by reference.

BACKGROUND OF THE INVENTION

1. Field of the Invention

The present invention relates to a hydraulic brake apparatus for supplying hydraulic brake pressure to each wheel brake cylinder operatively mounted on each wheel of a vehicle, and more particularly to the apparatus for advancing a master piston by means of a hydraulic boosting device having a pressure regulating valve.

2. Description of the Related Arts

Heretofore, there is known a hydraulic brake apparatus which is provided with a hydraulic boosting device having a pressure regulating valve for regulating hydraulic pressure of a hydraulic pressure source, and adapted to advance a master piston in response to output of the device, so as to discharge hydraulic braking pressure from a master chamber. For example, a brake pressure generating device for a vehicle is disclosed in the U.S. Pat. No. 5,515,678, which corresponds to Japanese Patent Laid-open publication No.7-172291. In this publication, it is described that hydraulic pressure regulated by a spool valve is transmitted to an auxiliary pressure chamber so as to boost up the operation a first piston, as disclosed in FIG. 1 of the patent.

According to the apparatus which is provided with the hydraulic boosting device having the pressure regulating valve for regulating the hydraulic pressure of the hydraulic pressure source in response to braking operation of a vehicle driver and discharging it, and adapted to apply the boosting force to the master piston, as disclosed in the publication, a sufficiently large capacity has to be provided for the master chamber, so that it is difficult to reduce the size of the apparatus. Therefore, it has been proposed to form the pressure regulating valve separately from the apparatus and provide it in parallel with the master cylinder, so as to reduce its length in the axial direction, for example. However, it is still difficult to reduce the size of the apparatus as a whole.

In accordance with a recent progress in electronics, it has been proposed to provide braking force with a combination of electronic means and hydraulic means, and provide a brake feeling to a vehicle driver in response to his braking operation, through a simulator, whereby the size of the apparatus can be reduced. According to this apparatus, however, it is not so easy to provide the brake feeling to the vehicle driver in response to a stroke of braking operation, and provide the brake feeling in response to depressed force to a brake pedal, appropriately. As a result, a complicated control apparatus will be required. When a vehicle deceleration is low, for example, it is desirable to provide the brake feeling in response to the stroke of braking operation, to increase the braking force in accordance with the stroke of the brake pedal. Thereafter, it is desirable to provide the brake feeling in response to the depressed force, without any stroke of the brake pedal, thereby to provide a rather rigid brake feeling.

SUMMARY OF THE INVENTION

Accordingly, it is an object of the present invention to provide a hydraulic brake apparatus for a vehicle, which is provided with a hydraulic boosting device having a pressure regulating valve for advancing a master piston, and which is capable of providing an appropriate brake feeling, and minimizing the apparatus as a whole.

In order to accomplish the above and other objects, the hydraulic brake apparatus is provided with a pressure source for generating hydraulic pressure, a hydraulic pressure boosting device having a pressure regulating valve for regulating the hydraulic pressure generated by the pressure source in response to braking operation by a vehicle driver, a master cylinder for advancing a master piston by the hydraulic pressure discharged from the hydraulic pressure boosting device to discharge the hydraulic braking pressure from a master chamber, and a wheel brake cylinder operatively mounted on each wheel of the vehicle for applying braking force to the wheel with the hydraulic braking pressure discharged from the master cylinder. A pressure detecting device is provided for detecting at least one of the hydraulic braking pressure discharged from the master cylinder and the hydraulic pressure discharged from the pressure regulating valve, and a pressure supply device is provided for supplying the hydraulic pressure from the pressure regulating valve into a hydraulic pressure circuit including the master cylinder and the wheel brake cylinder, when the hydraulic braking pressure discharged from the master cylinder is equal to or greater than a predetermined starting reference pressure set to be equal to or greater than hydraulic pressure corresponding to a predetermined vehicle deceleration, and/or when the hydraulic pressure discharged from the pressure regulating valve is approximately equal to or greater than the starting reference pressure.

As for the predetermined vehicle deceleration, 6.5 m/s$^2$ is preferable, for example. Therefore, as for the starting reference pressure which is set to be equal to or greater than hydraulic pressure corresponding to the vehicle deceleration, it is preferable to set the starting reference pressure to be equal to or greater than 6.5 MPa, for example. As the relationship between the starting reference pressure and the vehicle deceleration is varied depending on a coefficient of friction of a brake pad, aged deterioration or the like, they are not necessarily equivalent to each other. Therefore, it is preferable to set a predetermined value as a desirable vehicle deceleration, then set a pressure value, which is equal to or greater than the pressure capable of providing the desirable vehicle deceleration, as the starting reference pressure. Furthermore, the starting reference pressure provided for the hydraulic braking pressure discharged from the master cylinder, and the starting reference pressure provided for the hydraulic pressure discharged from the pressure regulating valve, may be se to be different from each other. For example, the latter starting reference pressure may be set to be a little higher than the former one.

Preferably, the pressure supply device begins to supply the hydraulic pressure from the pressure regulating valve into the hydraulic pressure circuit, when the hydraulic braking pressure discharged from the master cylinder is equal to or greater than the starting reference pressure, and/or when the hydraulic pressure discharged from the pressure regulating valve is approximately equal to or greater than the starting reference pressure, and terminates supplying the hydraulic pressure from the pressure regulating valve into the hydraulic pressure circuit, when the hydraulic braking pressure discharged from the master cylinder is lower than a predetermined terminating reference pressure, and/or when the hydraulic pressure discharged from the pressure regulating valve is lower than the terminating reference pressure. It is preferable to set the terminating reference pressure to be 5.5 MPa, for example.

In the hydraulic brake apparatus as described above, the pressure supply device preferably includes a first switching valve disposed on a passage for connecting the master cylinder with the wheel brake cylinder, and the pressure supply device may be arranged to supply the hydraulic pressure discharged from the pressure regulating valve into a first passage for connecting the first switching valve with the wheel brake cylinder, and the first switching valve may be placed in a closed position thereof when the hydraulic pressure is supplied from the pressure regulating valve to the hydraulic pressure circuit, to block the communication between the master cylinder and the wheel brake cylinder.

The hydraulic brake apparatus may further include a second switching valve disposed on a second passage for connecting the pressure regulating valve with the first passage at a position between the first switching valve and the wheel brake cylinder, and the first switching valve may be placed in a closed position thereof and the second switching valve may be placed in an open position thereof, when the hydraulic pressure is supplied from the pressure regulating valve to the hydraulic pressure circuit.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENT

Figure 1:
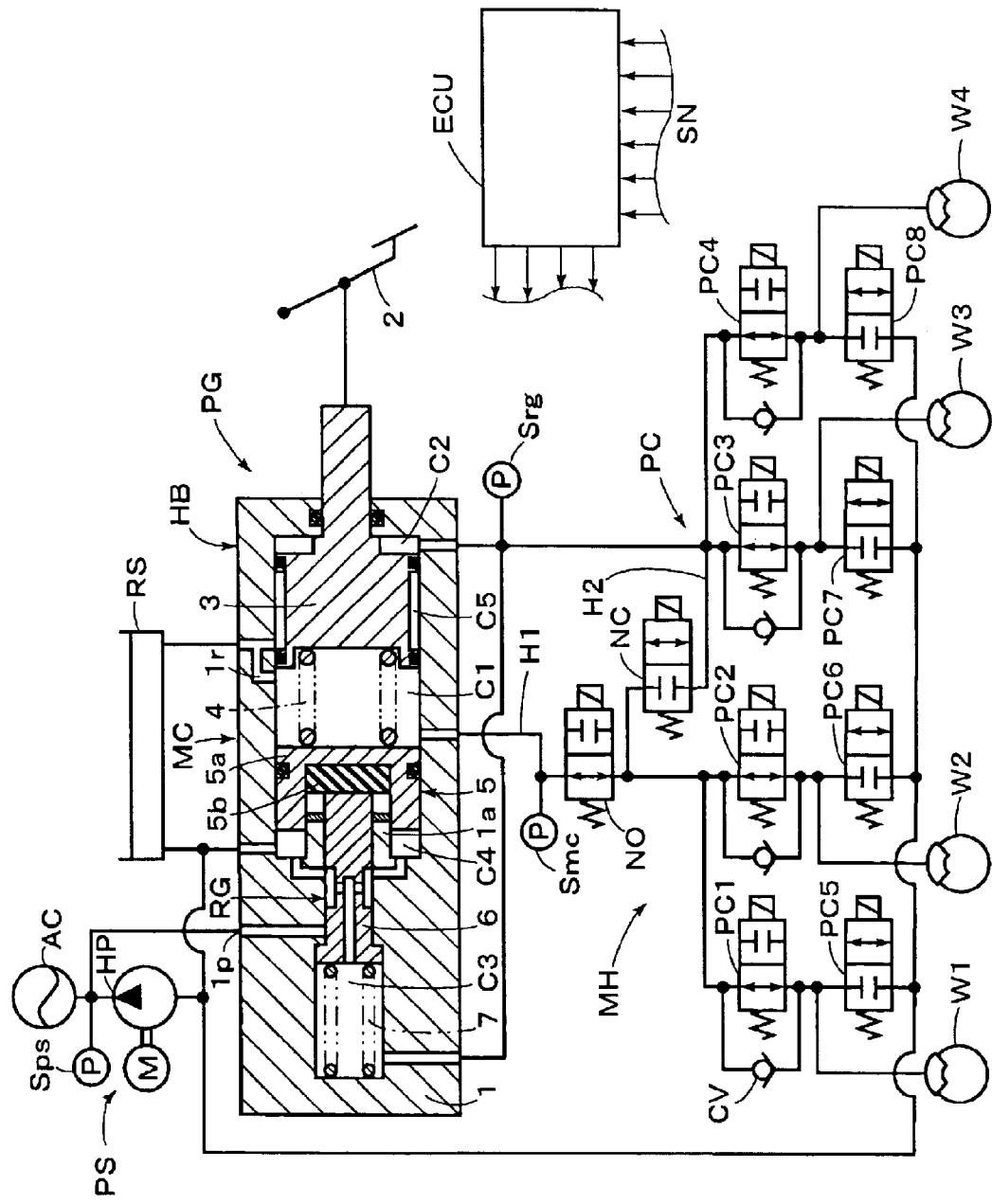
FIG. 1 is a sectional view of a hydraulic brake apparatus according to an embodiment of the present invention.

Referring to FIG. 1, there is illustrated a hydraulic brake apparatus for a vehicle according to an embodiment of the present invention, which includes a pressure generator PG for generating hydraulic pressure in response to operation of a brake pedal 2, i.e., braking operation by a vehicle driver. The apparatus includes wheel brake cylinders W1–W4, each of which is operatively mounted on each wheel of the vehicle, to apply braking force to the wheel with the hydraulic pressure fed from the pressure generator PG. And, a pressure control valve device PC is disposed between the pressure generator PG and the wheel brake cylinders W1–W4.

According to the present embodiment, the pressure generator PG is provided with a pressure source PS for generating a certain hydraulic pressure irrespective of operation of the brake pedal 2, a hydraulic pressure boosting device HB having a pressure regulating valve RG for regulating the hydraulic pressure generated by the pressure source PS in response to braking operation by a vehicle driver, and a master cylinder MC for discharging hydraulic braking pressure in response to the hydraulic pressure discharged from the hydraulic pressure boosting device HB. The pressure source PS includes an electric motor M controlled by an electronic control unit ECU, and a hydraulic pressure pump HP, which is driven by the electric motor M, and whose inlet is connected to a reservoir under atmospheric pressure RS (hereinafter, simply referred to as a reservoir RS), and whose outlet is connected to an accumulator AC. According to the present embodiment, a pressure sensor Sps is connected to the outlet, and the detected pressure is monitored by the electronic control unit ECU. On the basis of the monitored result, the motor M is controlled by the electronic control unit ECU to keep the hydraulic pressure in the accumulator AC between predetermined upper and lower limits.

In a cylinder 1 which serves as a body portion of the pressure generator PG, there is formed a stepped bore which includes a plurality of bores having different inner diameters from one another, and in which a master piston 3 is accommodated in a rear section and the pressure regulating valve RG is accommodated in a front section. Although the cylinder 1 is illustrated as one body in FIG. 1 to be understood easily, it is formed with a plurality of cylindrical members assembled together in practice. The master piston 3 has a plurality of land portions formed around its outer surface at its front and rear portions, so that a master chamber C1 is defined in front of it, and a boost chamber C2 is defined behind it. In front of the master chamber C1, a spool valve mechanism which constitutes the pressure regulating valve RG is accommodated. In front of a spool 6 which is a part of the spool valve mechanism, a regulated pressure chamber C3 is defined to communicate with the boost chamber C2, and a low pressure chamber C4 is defined behind the spool 6 to communicate with the reservoir RS. Between the front and rear land portions of the master piston 3, an annular chamber C5 is defined to communicate with the reservoir RS.

Between the master chamber C1 and the low pressure chamber C4, there is accommodated a distribution device 5, and a compression spring 4 is mounted between the distribution device 5 and the master piston 3. The distribution device 5 is provided for adjusting the relationship between braking operation force applied to the brake pedal 2 (i.e., depressing force) and the hydraulic pressure discharged from the pressure regulating valve RG. The distribution device 5 is fitted into a cylindrical portion 1a of the cylinder 1, and it includes a case 5a formed in the shape of a cylinder with a bottom, and with its open end placed to face an front end wall in the low pressure chamber C4, and includes a rubber disc 5b disposed between an inner surface of the case 5a and a rear end surface of the spool 6.

According to the distribution device 5, when the brake pedal 2 is depressed, the master piston 3 is advanced to transmit the braking operation force, through the compression spring 4 and the pressure in the master chamber C1, to the distribution device 5, and further to the spool 6 through the case 5a and rubber disc 5b. Consequently, the pressure regulating valve RG is operated to output the hydraulic pressure exerted in the regulated pressure chamber C3 in response to the braking operation force, which pressure is fed to the boost chamber C2, to provide boosting force (or, assisting force), whereby the braking operation force is reduced. If the brake pedal 2 is depressed further, the master piston 3 is advanced by the braking operation force and the assisting force, to transmit the braking operation force and the assisting force, through the compression spring 4 and the pressure in the master chamber C1, to the distribution device 5, and further transmitted to the spool 6, whereby the hydraulic pressure is exerted in the regulated pressure chamber C3 in response to the braking operation force and the assisting force. This hydraulic pressure is fed to the boost chamber C2, to provide further the assisting force, whereby the braking operation force (depressing force) is reduced. Then, if the braking operation force and the assisting force exceed a predetermined value, the elastically deformed rubber disc 5b abuts on the rear end of the cylindrical portion 1a in the cylinder 1, so that a part of the force acting on the case 5a is distributed to be transmitted to the cylinder 1 through the rubber disk 5b.

According to the present embodiment, therefore, can be given a jumping property which provides a steep rise of pressure in the beginning of the braking operation. Also, with the inner diameter of the case 5a and the outer diameter of the cylindrical portion 1a for receiving therein the case 5a varied, a distribution ratio of the braking operation to be transmitted to the spool 6 can be varied. Furthermore, with the length of the cylindrical portion 1a varied, a starting time for the distribution of the braking operation can be varied. Therefore, by combining the case 5a and the cylindrical portion 1a of different dimensions appropriately, the output property of the pressure regulating valve RG in response to the braking operation force can be provided as required. The distribution device 5 may be omitted, instead, it may be so constituted as to transmit the force acting on the case 5a directly to the spool 6.

As for the pressure regulating valve RG of the present embodiment, the compression spring 7 which acts as a return spring is accommodated in the regulated pressure chamber C3 to press the spool 6 rearward by its biasing force. The load for mounting the compression spring 7 is set to be larger than the load for mounting the compression spring 4, so that when the brake pedal 2 is not depressed, the state as shown in FIG. 1 is maintained. The low pressure chamber C4 is connected to the reservoir RS together with the inlet of the pressure source PS, so that the low pressure chamber C4 (and, the annular chamber C5) are filled with the brake fluid under approximately atmospheric pressure in the reservoir RS.

Accordingly, when the spool 6 is placed at the rearmost initial position as shown in FIG. 1, the regulated pressure chamber C3 is communicated with the low pressure chamber C4 through the spool 6 to be under the atmospheric pressure as in the reservoir RS. When the master piston 3 is moved forward, and then the spool 6 is moved forward to block the communication between the regulated pressure chamber C3 and the low pressure chamber C4, the pressure in the regulated pressure chamber C3 will be held. When the spool 6 is moved forward further, the regulated pressure chamber C3 is communicated with the pressure source PS through the spool 6 and the communication hole 1p, so that the hydraulic pressure discharged from the pressure source PS is fed into the regulated pressure chamber C3 to increase the hydraulic pressure therein, thereby to provide a pressure increasing state. Thus, in accordance with a repetition of relative movement of the spool 6 to the cylinder 1, the hydraulic pressure in the regulated pressure chamber C3 is regulated into a predetermined pressure, and discharged to the boost chamber C2, and also discharged to the wheel brake cylinders W3 and W4 as the hydraulic braking pressure, through switching solenoid valves PC3 and PC4 as will be described later.

In the master chamber C1, there is accommodated the compression spring 4 which acts as a return spring, and which forces the rear end surface of the master piston 3 to abut on the front end surface in the cylinder 1. In other words, when the master piston 3 is placed at its rearmost initial position, the volume in the boost chamber C2 is minimal, so that the master chamber C1 is communicated with the reservoir RS through a communication hole 1r, whereby the master chamber C1 is under approximately atmospheric pressure as in the reservoir RS. When the master piston 3 is moved forward, the communication hole 1r will be closed by its front end portion, to block its communication with the reservoir RS. Therefore, when the master piston 3 in this state is further moved forward, the hydraulic pressure in the master chamber C1 will be increased. And, the hydraulic pressure in the regulated pressure chamber C3 is regulated to provide a certain pressure, which is supplied to the boost chamber C2 to assist (boost) the advancing movement of the master piston 3.

As shown in FIG. 1, according to the present embodiment, the wheel brake cylinders W1 and W2 operatively mounted on the front wheels are connected to the master chamber C1 through the switching valves PC1 and PC2, respectively. On the contrary, the wheel brake cylinders W3 and W4 operatively mounted on the rear wheels are connected to the boost chamber C2 and the regulated pressure chamber C3 through the switching valves PC3 and PC4. Consequently, the hydraulic pressure output from the regulated pressure chamber C3 is supplied to the wheel brake cylinders W3 and W4 through the switching valves PC3 and PC4 placed in their open positions. Also, the hydraulic pressure output from the regulated pressure chamber C3 is supplied to the boost chamber C2, to advance the master piston 3, so that the hydraulic pressure discharged from the master chamber C1 is supplied to the wheel brake cylinders W1 and W2 through the switching valves PC1 and PC2 placed in their open positions.

According to the present embodiment, a pressure sensor Smc is disposed in a hydraulic passage connected to the master chamber C1 at the output side thereof, and a pressure sensor Srg is disposed in a hydraulic passage connected to the regulated pressure chamber C3 at the output side thereof, and signals detected by the sensors Smc and Srg are fed to the electronic control unit ECU. Thus, the hydraulic braking pressure discharged from the master chamber C1 and the hydraulic pressure output from the regulated pressure chamber C3 are monitored and provided for the controls as described later. Furthermore, in order to achieve those controls including an anti-skid control or the like, sensors SN such as wheel speed sensors, acceleration sensor or the like have been provided, so that the signals detected by them are fed to the electronic control unit ECU.

Furthermore, according to the present embodiment, the pressure control valve device PC is constituted by the switching valves PC1–PC8 and etc. as shown in FIG. 1, to control the hydraulic braking pressure (wheel brake cylinder pressure) in the anti-skid control, for example. As shown in FIG. 1, the switching valves PC1 and PC5, and the switching valves PC2 and PC6, for use in the control of supplying and draining the hydraulic pressure respectively, are disposed in hydraulic pressure circuits for connecting the master chamber C1 with the wheel brake cylinders W1 and W2 operatively mounted on the front wheels, respectively. Also, the switching valves PC3 and PC7, and the switching valves PC4 and PC8, for use in the control of supplying and draining the hydraulic pressure respectively, are disposed in hydraulic pressure circuits for connecting the boost chamber C2 with the wheel brake cylinders W3 and W4 operatively mounted on the rear wheels, respectively. The switching valves PC1–PC4 for supplying the hydraulic pressure are normally opened, while the switching valves PC5–PC8 for draining the hydraulic pressure are normally closed, and connected to the reservoir RS, respectively. In parallel with the switching valves PC1–PC4, a check valve CV is disposed, respectively, so that when the brake pedal 2 is released, the flow of brake fluid in the wheel brake cylinders W1–W4 to the master chamber C1 and regulated pressure chamber C3 is allowed, respectively, whereas its reverse flow is blocked. In FIG. 1, the overall hydraulic system has been divided into a pressure control circuit for the front wheels and a pressure control circuit for the rear wheels to provide a front-rear circuit system. Instead, a so-called diagonal circuit system may be employed. The switching valves PC1 and PC5 may be assembled together with each check valve CV, to provide a changeover valve for use in the control of supplying and draining the hydraulic pressure.

Furthermore, it is so constituted that the hydraulic pressure discharged from the pressure regulating valve RG (the regulated pressure chamber C3) can be supplied to the hydraulic pressure circuit MH including the master cylinder MC and the wheel brake cylinders W1 and W2 (and switching valves PC1 and PC2), through the switching valve NC. As shown in FIG. 1, the switching valve NO of a normally open two-port two-position solenoid operated switching valve is disposed on a passage H1 between the master chamber C1 and the switching valves PC1 and PC2 which communicate with the wheel brake cylinders W1 and W2, respectively. And, the switching valve NC of a normally closed two-port two-position solenoid operated switching valve is disposed between the switching valve NO and the wheel brake cylinders W1 and W2, i.e., on a passage H2 for connecting the downstream side of the switching valve NO with the regulated pressure chamber C3. The switching valve NC constitutes the pressure supply means of the present invention, together with the electronic control unit ECU. Therefore, it is so constituted that the hydraulic pressure is supplied from the pressure regulating valve RG into the hydraulic pressure circuit MH including the master cylinder MC and the wheel brake cylinders W1 and W2 (switching valves PC1 and PC2), with the switching valve NC placed in its open position, when the hydraulic braking pressure discharged from the master cylinder MC is equal to or greater than a starting reference pressure (predetermined pressure P1), and the hydraulic pressure discharged from the pressure regulating valve RG is equal to or greater than a predetermined pressure P2 (equal to or greater than the predetermined pressure P1).

The predetermined pressure P1 which serves as the starting reference pressure is set to be equal to greater than the hydraulic pressure corresponding to a predetermined vehicle deceleration. As for the predetermined vehicle deceleration, for example, 6.5 m/s$^2$ is preferable in view of a brake feeling. Therefore, as for the predetermined pressure P1 which is set to be equal to, or greater than the hydraulic pressure corresponding to the predetermined vehicle deceleration, the value equal to or greater than 6.5 MPa, for example, is preferable.

In operation, according to the pressure generator PG of the hydraulic brake apparatus of the embodiment as constituted above, when the brake pedal 2 is not depressed, the master piston 3 and the spool 6 of the pressure regulating valve RG are in the state as shown in FIG. 1. In this state, the spool 6 has been pressed onto the cylinder 1 at its rear end by the biasing force of the compression spring 7, so that the communication between the regulated pressure chamber C3 and the communication hole 1p (pressure source PS) is blocked, whereas the regulated pressure chamber C3 is communicated with the low pressure chamber C4 (i.e., the pressure decreasing state). Consequently, the regulated pressure chamber C3 has been communicated with the reservoir RS to be under approximately atmospheric pressure, so that the hydraulic pressure discharged from the regulated pressure chamber C3 is not supplied to the boost chamber C2.

When the depressing force is applied to the brake pedal 2, the braking operation force is transmitted to the spool 6 through the master piston 3, compression spring 4 and distribution device 5, to advance the spool 6, with the compression spring 7 being compressed. When the brake pedal 2 is depressed further against the biasing force of the compression spring 7, and the spool 6 is placed at a position where the regulated pressure chamber C3 does not communicate with the communication hole 1p, nor the low pressure chamber C4, the pressure holding state is provided. When further depressing force is applied to the brake pedal 2 to advance the spool 6, the regulated pressure chamber C3 will communicate with the communication hole 1p, with the communication between the regulated pressure chamber C3 and the low pressure chamber C4 being blocked, so that the regulated pressure chamber C3 will communicate with the communication hole 1p, to supply the hydraulic pressure output from the pressure source PS to the regulated pressure chamber C3, through the communication hole 1p. As a result, the pressure increasing state is provided.

Therefore, if the brake pedal 2 is depressed in the pressure decreasing state as shown in FIG. 1, the hydraulic pressure determined in response to the braking operation stroke is supplied from the master chamber C1 to the wheel brake cylinders W1 and W2, through the switching valves PC1 and PC2 placed in their open positions. Also, the hydraulic pressure in the regulated pressure chamber C3 is regulated into the hydraulic pressure, which is determined in response to the force transmitted from the master piston 3 to the spool 6 through the compression spring 4 and the hydraulic pressure in the master chamber C1 and the distribution device 5, by the pressure regulating valve RG, then the regulated pressure is supplied to the boost chamber C2, thereby to boost the master piston 3, and supplied to the wheel brake cylinders W3 and W4, through the switching valves PC3 and PC4 placed in their open positions. And, when the hydraulic braking pressure discharged from the master chamber C1 is equal to or greater than the predetermined pressure P1, and when the hydraulic pressure discharged from the regulated pressure chamber C3 is equal to or greater than the predetermined pressure P2, the switching valves NC and NO are controlled to be opened and closed, as will be explained later with reference to FIG. 2.

Furthermore, according to the present embodiment, the switching valves PC1–PC8 are controlled by the electronic control unit ECU, to open or close the switching valves PC1–PC8, thereby to control the hydraulic braking pressure in each wheel brake cylinder to be rapidly increased, gradually increased (pulse increase mode), gradually decreased (pulse decrease mode), rapidly decreased, or held, in response to the signals detected by each sensor SN, so that the hydraulic pressure control required for the anti-skid control can be made. In this respect, the hydraulic pressure control as described above is not directly related to the present invention, so that explanation of its operation is omitted herein.

Figure 2:
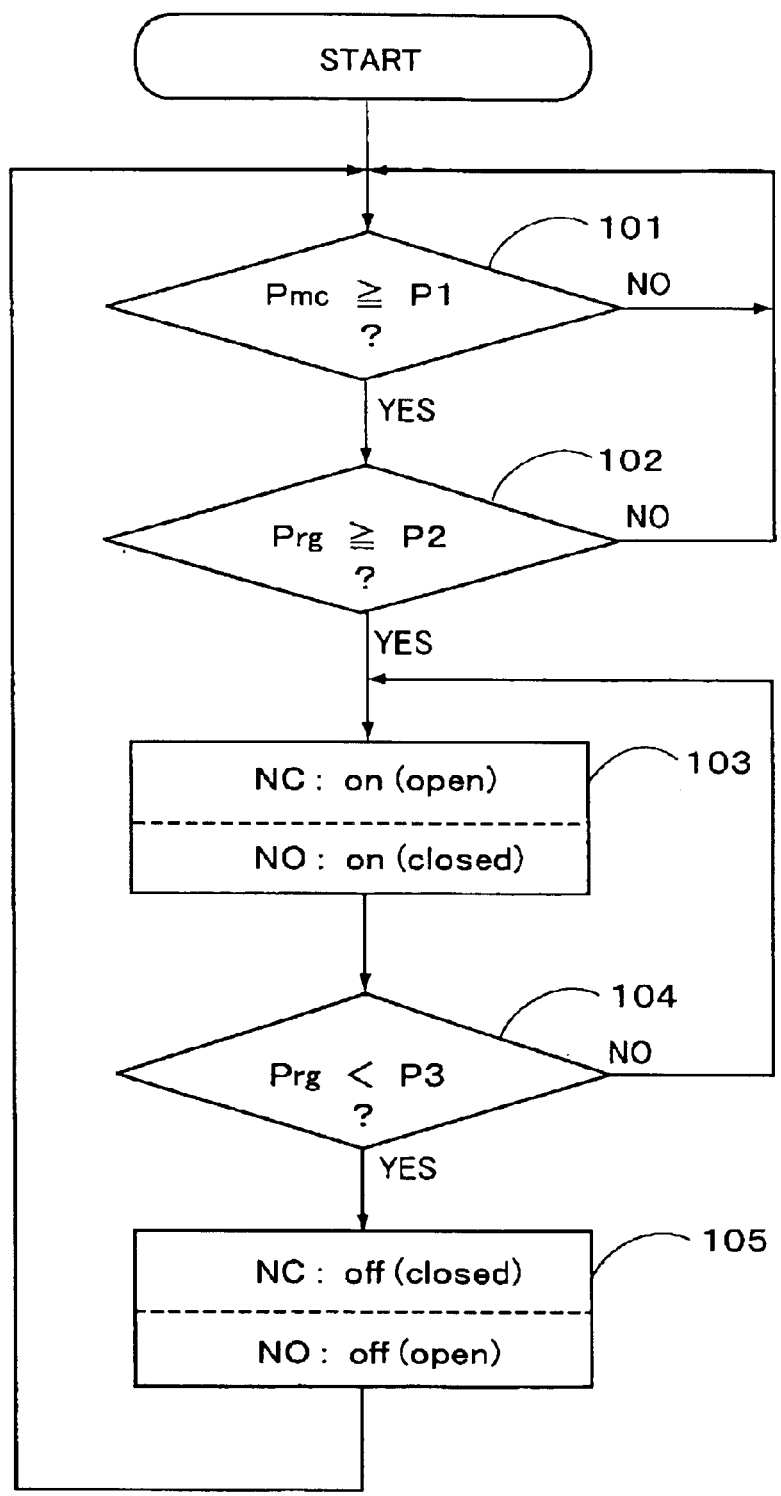
FIG. 2 is a flowchart showing an example of operation of a hydraulic brake apparatus according to an embodiment of the present invention.

According to the present embodiment, the switching valves NC and NO are controlled by the electronic control unit ECU, as shown in FIG. 2. At the outset, the pressure Pmc detected by the pressure sensor Smc, which corresponds to the hydraulic braking pressure discharged from the master cylinder MC, is compared with the predetermined pressure P1 which corresponds to the starting reference pressure, at Step 101. The predetermined pressure P1 is set to be equal to or greater than the hydraulic pressure (e.g., 6.5 MPa) which corresponds to the predetermined vehicle deceleration (e.g., 6.5 m/s$^2$). When it is determined that the pressure Pmc detected by the pressure sensor Smc is equal to or greater than the predetermined pressure P1, the program further proceeds to Step 102, where the pressure Prg detected by the pressure sensor Srg, which corresponds to the hydraulic pressure output from the pressure regulating valve RG, is compared with the predetermined pressure P2.

The predetermined pressure P2 is set to be a little greater than the predetermined pressure P1 (e.g., 6.7 MPa), but it may be set to be of the same value as the predetermined pressure P1. When it is determined that the pressure Prg detected by the pressure sensor Srg is equal to or greater than the predetermined pressure P2, the program proceeds to Step 103, where the switching valve NO is energized (turned on), to be placed in its closed position, and the switching valve NC is energized (turned on), to be placed in its open position.

After the hydraulic braking pressure control in response to the stroke of braking operation as described above, the hydraulic pressure discharged from the pressure regulating valve RG is supplied to the hydraulic pressure circuit MH including the master cylinder MC and the wheel brake cylinders W1 and W2, to perform the hydraulic braking pressure control in response to the braking operation force, so that appropriate hydraulic braking pressure is applied to the wheel brake cylinders W1 and W2. As a result, when the vehicle deceleration is lower than 6.5 m/s$^2$, for example, such a brake feeling as the one responsive to the stroke of the brake pedal 2 can be obtained, and when the vehicle deceleration is equal to or greater than 6.5 m/s$^2$, a rather rigid brake feeling responsive to the depressing force applied to the brake pedal 2 can be obtained. When the braking operation is terminated, for example, to result in reduction of the hydraulic braking pressure discharged from the pressure regulating valve RG, the program proceeds to Step 104, where the pressure Prg detected by the pressure sensor Srg is compared with the predetermined pressure P3 (e.g., 5.5 MPa), which corresponds to the terminating reference pressure. As a result, if it is determined that the detected pressure Prg is lower than the predetermined pressure P3, the program proceeds to Step 105, where the switching valve NC is de-energized (turned off) to be placed in its closed position, and the switching valve NO is de-energized (turned off) to be placed in its open position. If it is determined that the pressure Prg detected by the pressure sensor Srg has exceeded the predetermined pressure P3 at Step 104, the program returns to Step 103, where the switching valve NC is held in its open position, and the switching valve NO is held in its closed position.

Thus, when it is determined that the pressure Pmc is equal to or greater than the predetermined pressure P1, and that the pressure Prg is equal to or greater than the predetermined pressure P2, the hydraulic pressure discharged from the pressure regulating valve RG is supplied to the hydraulic pressure circuit MH including the master cylinder MC and the wheel brake cylinders W1 and W2, to shift the hydraulic braking pressure control from the one responsive to the stroke of braking operation, to the one responsive to the braking operation force (depressing force), so that appropriate hydraulic braking pressure is applied to the wheel brake cylinders W1 and W2. Therefore, the master chamber C1 may be of a volume enough for receiving therein the brake fluid until the detected pressure Pmc will be equal to or greater than the predetermined pressure P1 (and/or the detected pressure Prg will be equal to or greater than the predetermined pressure P2). As a result, a portion for constituting the master cylinder MC can be minimized, so that the size of the hydraulic braking apparatus can be reduced as a whole. When it is determined that the pressure Pmc is lower than the predetermined pressure P3, the switching valve NC is placed in its closed position to terminate supplying the hydraulic pressure from the pressure regulating valve RG into the hydraulic pressure circuit MH. In this case, because the terminating reference (predetermined pressure P3) and starting references (predetermined pressures P1 and P2) are different in pressure from each other, the hunting will not be caused, thereby to terminate the hydraulic pressure control smoothly.

It should be apparent to one skilled in the art that the above-described embodiments are merely illustrative of but one of the many possible specific embodiments of the present invention. Numerous and various other arrangements can be readily devised by those skilled in the art without departing from the spirit and scope of the invention as defined in the following claims.

What is claimed is:

1. A hydraulic brake apparatus for a vehicle comprising:
a pressure source for generating hydraulic pressure;
a hydraulic pressure boosting device having a pressure regulating valve for regulating the hydraulic pressure generated by said pressure source in response to braking operation by a vehicle driver;
a master cylinder for advancing a master piston by the hydraulic pressure discharged from said hydraulic pressure boosting device to discharge the hydraulic braking pressure from a master chamber;
a wheel brake cylinder operatively mounted on each wheel of said vehicle for applying braking force to said wheel with the hydraulic braking pressure discharged from said master cylinder;
pressure detecting means for detecting at least one of the hydraulic braking pressure discharged from said master cylinder and the hydraulic pressure discharged from said pressure regulating valve, and
pressure supply means for permitting the hydraulic pressure discharged from said pressure regulating valve to be supplied into a hydraulic pressure circuit including said master cylinder and said wheel brake cylinder, when the hydraulic braking pressure discharged from said master cylinder is equal to or greater than a predetermined starting reference pressure set to be equal to or greater than hydraulic pressure corresponding to a predetermined vehicle deceleration, and/or when the hydraulic pressure discharged from said pressure regulating valve is approximately equal to or greater than said starting reference pressure, said pressure supply means being positioned downstream of said pressure regulating valve.

2. A hydraulic brake apparatus as set forth in claim 1, wherein said pressure supply means begins to supply the hydraulic pressure from said pressure regulating valve into said hydraulic pressure circuit, when the hydraulic braking pressure discharged from said master cylinder is equal to or greater than said starting reference pressure, and/or when the hydraulic pressure discharged from said pressure regulating valve is approximately equal to or greater than said starting reference pressure, and wherein said pressure supply means terminates supplying the hydraulic pressure from said pressure regulating valve into said hydraulic pressure circuit, when the hydraulic braking pressure discharged from said master cylinder is lower than a predetermined terminating reference pressure, and/or when the hydraulic pressure discharged from said pressure regulating valve is lower than said terminating reference pressure.

3. A hydraulic brake apparatus as set forth in claim 2, wherein said pressure supply means includes a first switching valve disposed on a passage for connecting said master cylinder with said wheel brake cylinder, and wherein said pressure supply means is arranged to supply the hydraulic pressure discharged from said pressure regulating valve into a first passage for connecting said first switching valve with said wheel brake cylinder, and wherein said first switching valve is placed in a closed position thereof when the hydraulic pressure is supplied from said pressure regulating valve to said hydraulic pressure circuit, to block the communication between said master cylinder and said wheel brake cylinder.

4. A hydraulic brake apparatus as set forth in claim 3, further comprising a second switching valve disposed on a second passage for connecting said pressure regulating valve with said first passage at a position between said first switching valve and said wheel brake cylinder, and wherein said first switching valve is placed in a closed position thereof and said second switching valve is placed in an open position thereof, when the hydraulic pressure is supplied from said pressure regulating valve to said hydraulic pressure circuit.

5. A hydraulic brake apparatus as set forth in claim 1, wherein said pressure supply means includes a first switching valve disposed on a passage for connecting said master cylinder with said wheel brake cylinder, and wherein said pressure supply means is arranged to supply the hydraulic pressure discharged from said pressure regulating valve into a first passage for connecting said first switching valve with said wheel brake cylinder, and wherein said first switching valve is placed in a closed position thereof when the hydraulic pressure is supplied from said pressure regulating valve to said hydraulic pressure circuit, to block the communication between said master cylinder and said wheel brake cylinder.

6. A hydraulic brake apparatus as set forth in claim 5, further comprising a second switching valve disposed on a second passage for connecting said pressure regulating valve with said first passage at a position between said first switching valve and said wheel brake cylinder, and wherein said first switching valve is placed in a closed position thereof and said second switching valve is placed in an open position thereof, when the hydraulic pressure is supplied from said pressure regulating valve to said hydraulic pressure circuit.

7. A hydraulic brake apparatus as set forth in claim 6, wherein said first switching valve is a normally open two-port two-position solenoid operated switching valve, and wherein said second switching valve is a normally closed two-port two-position solenoid operated switching valve.

* * * * *